(12) United States Patent
De Haan

(10) Patent No.: US 8,588,312 B2
(45) Date of Patent: Nov. 19, 2013

(54) METHOD AND DEVICE FOR INFORMATION TRANSMISSION WITH TIME INFORMATION FOR CONTROLLING A PERIOD OF TIME FOR OVERLAY INFORMATION DISPLAY

(75) Inventor: Wiebe De Haan, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 250 days.

(21) Appl. No.: 13/076,829

(22) Filed: Mar. 31, 2011

(65) Prior Publication Data

US 2011/0234907 A1    Sep. 29, 2011

Related U.S. Application Data

(60) Continuation of application No. 10/309,588, filed on Dec. 4, 2002, which is a division of application No. 08/516,836, filed on Aug. 18, 1995, now abandoned.

(30) Foreign Application Priority Data

Jul. 21, 1995 (EP) ................................. 95202012

(51) Int. Cl.
*H04N 7/12* (2006.01)
(52) U.S. Cl.
USPC ....... 375/240.26; 348/468; 348/589; 348/600
(58) Field of Classification Search
USPC ......... 375/240.01, 240.26; 348/468, 589, 600
IPC ....................................................... H04N 7/12
See application file for complete search history.

(56) References Cited

U.S. PATENT DOCUMENTS

| | | | |
|---|---|---|---|
| 4,821,102 | A | 4/1989 | Ichikawa et al. |
| 4,953,153 | A | 8/1990 | Suzuki |
| 4,992,886 | A | 2/1991 | Klappert |
| 5,097,349 | A | 3/1992 | Nomura et al. |
| 5,151,793 | A | 9/1992 | Ito et al. |
| 5,185,665 | A | 2/1993 | Okura et al. |
| 5,206,929 | A | 4/1993 | Langford et al. |
| 5,245,600 | A | 9/1993 | Yamauchi et al. |
| 5,280,572 | A | 1/1994 | Case et al. |
| 5,301,028 | A | 4/1994 | Banker et al. |
| 5,424,785 | A | 6/1995 | Orphan |
| 5,497,241 | A | 3/1996 | Ostrover et al. |
| 5,519,443 | A | 5/1996 | Salomon et al. |
| 5,521,712 | A | 5/1996 | Oguro |
| 5,541,662 | A | 7/1996 | Adams et al. |
| 5,606,539 | A | 2/1997 | De Haan et al. |
| 5,731,847 | A | 3/1998 | Tsukagoshi |
| 2001/0031136 | A1 | 10/2001 | Kawamura et al. |

FOREIGN PATENT DOCUMENTS

| | | |
|---|---|---|
| CN | 1048279 A | 1/1991 |
| EP | 0056207 A1 | 7/1982 |
| EP | 0332776 A2 | 9/1989 |

(Continued)

*Primary Examiner* — Young Lee

(57) ABSTRACT

Video information intended to be reproduced on a television screen (1) often includes additional information such as graphics information (3) or subtitles (4) in addition to the main information such as film images (2). This additional information is transmitted separately, so that the user may choose whether the additional information is to be displayed or not. In the disclosed method the transmitted video signal comprises information relating to the duration (25) for which the additional information is to remain on the display. With this method the additional information can be displayed exactly for the duration of the desired time. When a video disc or tape is used for transferring video information, this is advantageous in trick modes, such as Fast Forward.

21 Claims, 3 Drawing Sheets

(56) References Cited

FOREIGN PATENT DOCUMENTS

| | | | |
|---|---|---|---|
| EP | 0404251 | A1 | 12/1990 |
| EP | 0651391 | A2 | 10/1994 |
| EP | 0686973 | A1 | 12/1995 |
| JP | 022598 | A | 1/1990 |
| JP | 2-170687 | | 7/1990 |
| JP | 7-177459 | | 7/1995 |
| WO | 9200647 | A1 | 1/1992 |

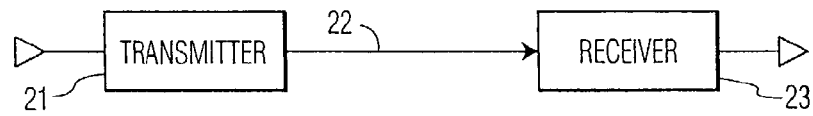
FIG. 2
| SYNTAX | NO. OF BITS |
|---|---|
| page | |
|     page_start_code | 16 |
|     page_data_length | 16 |
|     ... | .. |
|     duration | 32 |
|     ... | .. |
FIG. 3
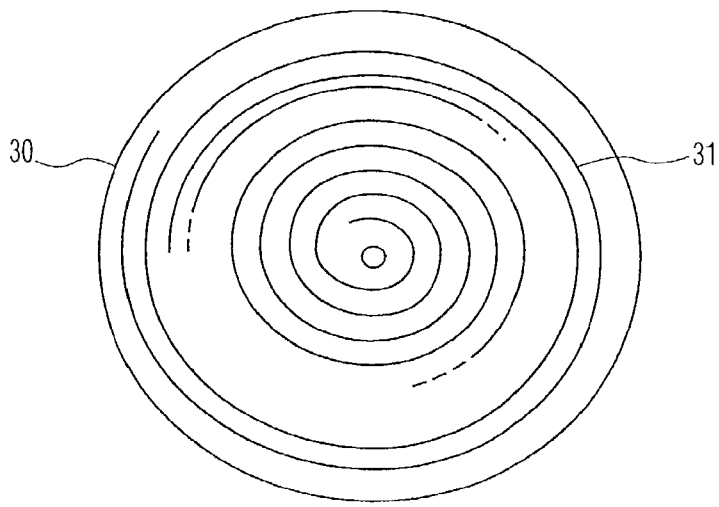
FIG. 4
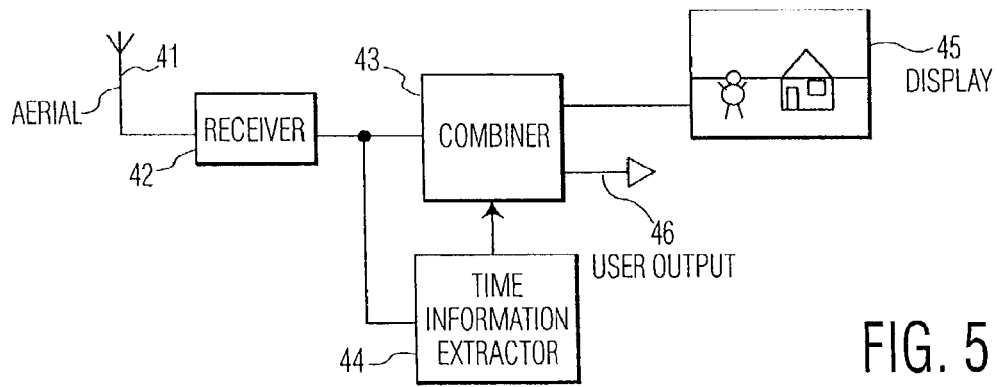
FIG. 5

METHOD AND DEVICE FOR INFORMATION TRANSMISSION WITH TIME INFORMATION FOR CONTROLLING A PERIOD OF TIME FOR OVERLAY INFORMATION DISPLAY

This is a continuation of prior application Ser. No. 10/309,588 filed Dec. 4, 2002 which is a divisional of application Ser. No. 08/516,836 filed Aug. 18, 1995 and are both incorporated by reference herein.

The invention relates to a method of transmitting video information intended to be reproduced on a display via an information signal that represents the video information, the video information comprising basic information and overlay information related to the basic information.

The invention further relates to an information carrier on which an information signal is recorded, which signal represents video information intended to be reproduced on a display, which video information comprises basic information and overlay information related to the basic information.

The invention further relates to a device for receiving and a device for transmitting information to be used in the method.

Such a method, information carrier and device are known from WO 92/00647. A video signal for which the basic information is analog video information, is transferred via a laser disc. Digitally encoded subtitle information is then recorded on the laser disc as overlay information separated from the video information in the sub-code of the digital audio signal. When this sub-code information is generated, the subtitle information is read from a file in which also the instant at which the text is to be shown is indicated. The subtitles are then recorded in the audio signal sub-code that corresponds to this instant. On reproduction, the subtitles are displayed once they have been recovered from the sub-code.

A problem in the known method is that a subtitle displayed on a television screen stays there until a next subtitle is received, so that a subtitle may remain too long on the screen in the case of, for example, a change of scenes. This may particularly occur if the next subtitle is not received, for example, when trick modes of the laser disc, such as Fast Forward or Backward, are used.

It is an object of the invention to provide means for transmitting video information for which the reproduction of overlay information is independent of information to be transmitted at a later stage.

According to a first aspect of the invention, a method of the type defined in the opening paragraph is thereto characterized in that the overlay information comprises time information which is indicative of a period of time during which the overlay information is to be displayed. The method according to the invention is advantageous, for example, in that the overlay information may be shown on a television screen for any desired period of time. This provides that displaying the overlay information may be linked more with the basic information.

An embodiment for the method according to the invention is characterized in that the time information comprises a duration indicative of the duration reckoned from an instant at which the overlay information may appear on the display. This embodiment is advantageous in that the given duration can be simply counted during display. A further advantage is achieved in the Fast Forward or Fast Backward mode in which the overlay information can still be displayed for the original duration.

A further embodiment for the method according to the invention is characterized in that the basic information includes time codes indicative of a relative time of the basic information, and in that the time information includes a time of removal indicative of a relative instant after which the particular overlay information is to be removed from the display. This embodiment is advantageous in that during reproduction the duration may be simply determined by comparing the time of removal with the running relative time. The moment a more advanced relative time is found, the overlay information is removed from the display.

A further embodiment for the method according to the invention is characterized in that the basic information comprises video information and the overlay information comprises graphics information. This embodiment is advantageous in that the basic information is a moving image and the overlay information is a graphics picture optionally to be overlaid.

A further embodiment for the method according to the invention is characterized in that the overlay information comprises subtitle texts. This embodiment is advantageous in that the subtitle texts can be optionally overlaid on the basic information.

A further embodiment for the method according to the invention is characterized in that the basic information comprises digital, compressed video information. This embodiment is advantageous in that both the basic information and the overlay information may be transmitted in like manner, represented by digital symbols.

According to a second aspect of the invention, an information carrier of a type defined in the opening paragraph is thereto characterized in that the overlay information comprises time information which is indicative of a period of time during which the overlay information is to be displayed. The information carrier according to the invention is advantageous, for example, in that the overlay information may be displayed on a television screen for the desired duration, irrespective of other information to be read subsequent to that particular overlay information. For the provider of the video information it is advantageous that the duration may be determined irrespective of the playing device.

According to a third aspect of the invention, a device comprising means for receiving an information signal of a type defined in the opening paragraph and combining means for generating a video signal representative of the basic information in combination with the overlay information, is thereto characterized in that the device comprises means for recovering the time information from the information signal and in that the combining means are arranged for displaying the overlay information as a function of the time information. The device according to the invention is advantageous, for example, in that for the desired duration the overlay information can be combined with the basic information for displaying information on a television screen which information is irrespective of other information to be received subsequent to that particular overlay information.

According to a fourth aspect of the invention, a device comprising generator means for generating an information signal of a type defined in the opening paragraph and means for transmitting the information signal is characterized in that the device comprises means for generating the time information and the generator means are arranged for adding the time information to the overlay information. The device according to the invention is advantageous, for example, in that during the transmission there may be determined how long the overlay information is to be displayed together with the basic information without the necessity of including information in the information signal at a later instant.

These and other aspects of the invention will be apparent from and elucidated with reference to the embodiments described hereinafter.

In the drawings:

FIG. 2 shows a system for transmitting video information,

FIG. 3 shows a Table of duration-information,

FIG. 4 shows an information carrier,

FIG. 5 shows a device for receiving video information,

Elements corresponding to elements described in previous Figures carry like reference characters.

Figure 1A:
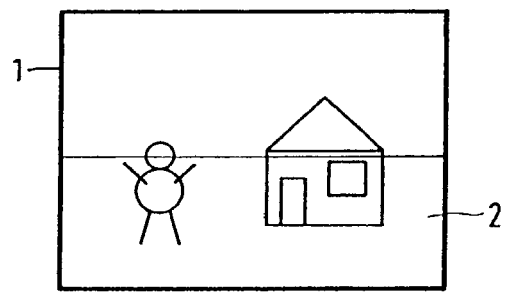
FIG. 1 shows a television screen displaying video information.
Figure 1B:
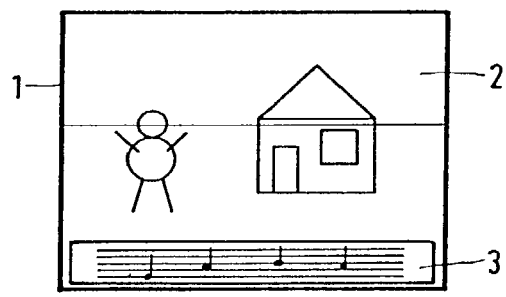
Figure 1C:
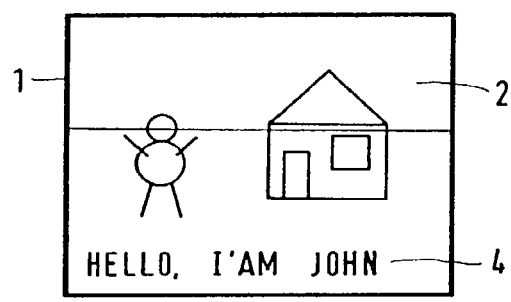

FIG. 1 shows a television screen 1 on which video information is displayed. This video information comprises basic information 2 displayed over the entire surface of the television screen as shown in FIG. 1a. The basic information 2 may be formed by moving images, such as film images or a television program. The basic information may also comprise animations or still, photographic images. FIG. 1b shows the same basic information 2 on which graphics information 3 is displayed as overlay information. For example, the basic information 2 may remain the same in the background, whereas repeatedly new musical notes may be displayed as overlay information. FIG. 1c shows a subtitle text 4 as overlay information such as can be used for films. In a television system the overlay information is combined with the basic information prior to transmission and this overlay information is transmitted along in each image of the basic information. By transmitting the overlay information in a separate manner as is done, for example, in said WO 92/00647, more than one piece of overlay information can be transmitted along. The user may then choose, for example, from several languages, or omit the subtitles 4 entirely.

FIG. 2 shows a system for video information transmission. The video information is transmitted via an information signal such as, for example, a television signal, a digitally modulated signal via a network, or a recorded signal on a magnetic tape, such as VCR (Video Cassette Recorder) or on an optical disc such as a laser disc or digital video disc. The device 21 for transmitting the information signal will transmit the video information signal to the receiving device 23 by the transmission channel 22. The receiving device 23 reproduces the video signal for the user. The information signal comprises at least a representation of the basic information such as, for example, an analog PAL or NTSC video signal or an MPEG-1 or MPEG-2 digitally encoded and compressed video signal. In addition, the information signal comprises a representation of the overlay information encoded by information symbols which symbols may be separately recovered from the basic information. A page of overlay information will be replaced if after a while a next page of overlay information is received. Another option is transmitting the overlay information along with every new image. However, this is at the cost of much transmission capacity, especially if, for example, subtitles for a plurality of languages are to be transmitted. In a video signal the symbols may be transmitted along in the form of digital signals during the horizontal or vertical blanking. In fully digitized information streams a separate user data stream may be transmitted by multiplexing, for example, by subdividing the digital data stream into packets and providing them with headers which denote the type of information. In the case of MPEG-2, the video information is encoded as described in ITU/ISO 13818-2 international standard. In ITU/ISO 13818-1 is described how elementary streams of encoded video data are multiplexed together with other encoded data representative of, for example, audio and subtitles into an MPEG-2 program stream. Information of a type not specified by MPEG can be included in 'private packets' in a format to be chosen at will. MPEG-2 then distinguishes packets carrying an additional header of a prescribed format as "private stream 1", and without a prescribed format as "private stream 2". The subtitles may be included, for example, in private stream 1 packets; these packets may comprise an optional presentation time stamp which denotes the initial presentation time on the television screen. A subtitle will not be replaced until the presentation time of a next subtitle has come.

In the information signal according to the invention, the overlay information comprises time information indicating a duration for which the overlay information is to be displayed on the television screen. Symbols described above intended for the overlay information are included in the information signal, for example, in private packets in a MPEG-2 stream. These packets now contain a time code. FIG. 3 shows in a Table an example of an information signal with a time code according to the invention which can be added to the overlay information to control the display of an overlay page. The available number of bits is given per parameter. A page_start_code denotes the beginning of the page, a page_data_length denotes the amount of information of the page and there is room for other control information, for example, the duration 25. The time code may denote, for example, the duration in seconds (or parts thereof). A different suitable time unit such as the number of frames or the number of units of an available system clock, for example, 90 kHz in MPEG, may also be selected. This duration starts when the overlay information is displayed on the television screen, for example, after the presentation time stamp in MPEG-2.

In the case of a basic information signal which comprises time codes indicative of a relative time of the basic information, there is a time indication available in a relation to the displayed basic image. In this case the time information may be indicated by a time of removal, which is indicative of the (relative) instant from which the particular overlay information is no longer to be displayed on the television screen. The time information for MPEG-2 may be included, for example, in the extension of the packet header or in the user data.

FIG. 4 shows a disc-shaped optically readable information carrier 30 such as a CD or laser disc. In a helical or concentric track 31 is recorded the information signal which represents video information to be displayed on a television screen. A description of the reading of a CD can be found in the title "Principles of optical disc systems" by Brouwhuis et al., ISBN 0-85274-785-3. The video information and the information signal are described with reference to FIGS. 1 and 2. The overlay information then comprises in a manner described with reference to FIG. 3 time information which is indicative of a duration for which the overlay information is to be displayed on the television screen.

FIG. 5 shows a device for receiving video information, such as a satellite receiver or a television signal decoder also referenced set-top-box. The transmitted signal arrives at the receiving means 42 via an aerial 41 (no part of the device) or via a cable connector. In the receiving means 42 the information signal is recovered and fed to combining means 43 in which a video signal is generated from the basic information combined with the overlay information. The information signal is also fed to means 44 for recovering the time information, while these means 44 at the appropriate instants give a command to the combining means 43 to remove the overlay information from the television screen in dependence on the time information. The video signal may be supplied to the user through output 46. In another embodiment the device also comprises a display 45 on which the image can be reproduced direct.

Figure 6:
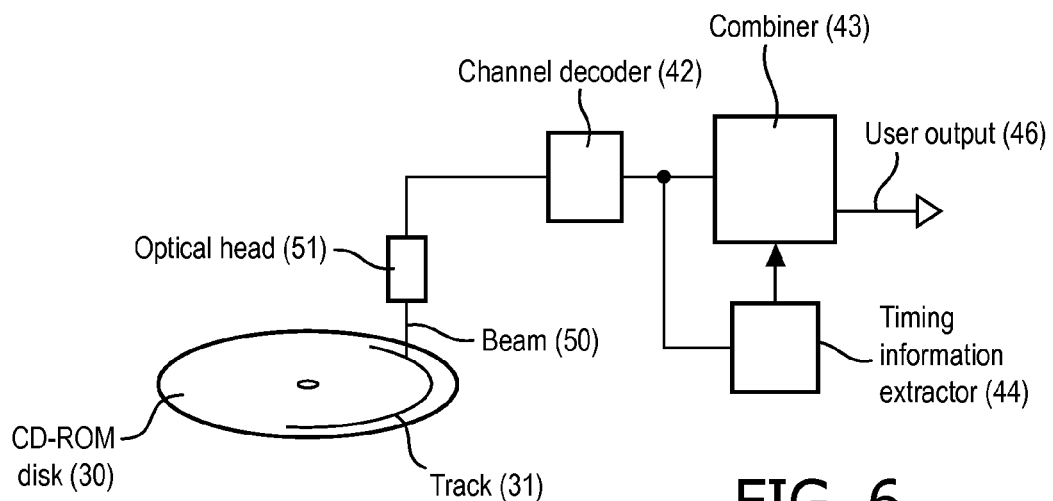
FIG. 6 shows a device for reading an information carrier.

FIG. 6 shows a device for reading an information carrier 30, such as, for example, a CD. The device comprises scanning means 51 for scanning the track 31 via an optical beam 50. The device further corresponds to the device of FIG. 5. The received signal goes to the receiving means 42 and, subsequent thereto, to the combining means 43 and the means 44 for recovering the time codes. The information signal processing has been described with reference to FIG. 5.

Figure 7:
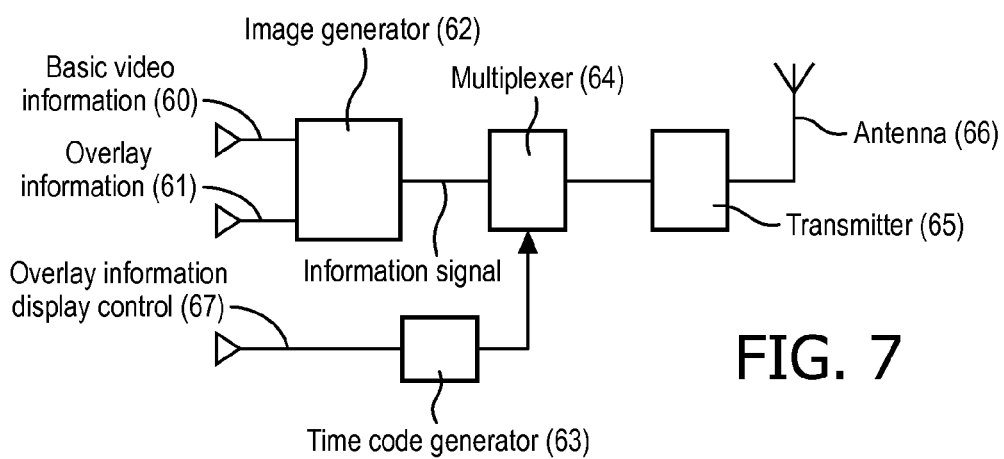
FIG. 7 shows a device for transmitting video information.

FIG. 7 shows a device for transmitting video information such as, for example, a television transmitter. The video information is fed to image generator means 62; the basic information is fed through an input 60 and the overlay information through a separate input 61. The image generator means 62 encode the video information and generate the information signal. Information about the display of overlay information is fed through input 67 to the time code generator means 63 which generates time codes for the duration of the display. The duration may, for example, be predefined and stored in a computer file, but the duration may also be automatically derived from the length of a subtitle or manually by an operator. In a multiplexer 64 the generated time codes are added to the overlay information, after which the complete information signal is amplified in the transmitting means 65 to be transmitted via antenna 66. If subtitle texts for a film are available in two languages, the time code generator means 63 will generate separate time codes for the two languages. In the receiver there may then be selected between no subtitling or subtitling in either language.

Figure 8:
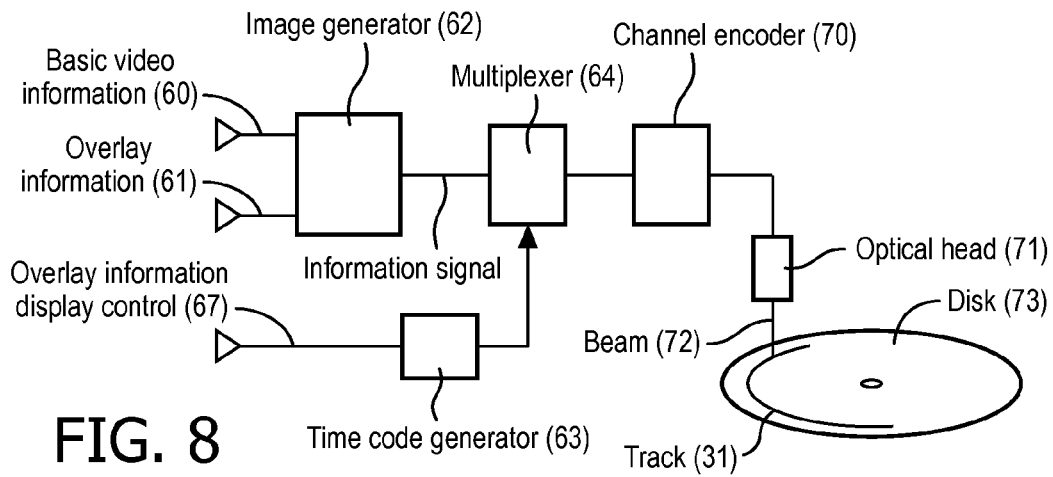
FIG. 8 shows a device for transmitting video information via information carriers.

FIG. 8 shows a device for transmitting video information via information carriers, such as, for example, for CD-ROMs. First a master information carrier is made by the device shown. From this master information carrier are then produced a multiplicity of information carriers with a customary process with moulds and presses (not shown). The complete information signal is generated by generator means (62, 63, 64) as described with reference to FIG. 7. The channel encoding unit 70 encodes the information signal in a manner customary to the disc-shaped carrier and passes this information on to the radiation unit 71. Radiation unit 71, by means of radiation beam 72, for example, a high-intensity laser beam, introduces effects on the master information carrier 73. A system controller of a customary type (not shown) provides the control of the speed of rotation of the disc and the positioning of the radiation unit 71 over the track 31. For a further description of the CD system reference be made to the title stated with reference to FIG. 4. In another embodiment a similar device is suitable for recording the information signal on a record carrier which is directly recordable, such as a CD recordable, a VCR tape or an optical tape.

The embodiments for devices are not restricted to the examples of FIGS. 5, 6, 7 and 8 and comprise any device for receiving and/or transmitting video information while overlay information comprises time information indicating the duration of display.

The invention claimed is:

1. A method of transmitting video information for reproduction on a display via an information signal that represents the video information,
the video information being a multiplexed MPEG stream,
the video information comprising basic information and overlay information related to the basic information,
the basic information being an elementary stream of encoded video data,
the overlay information comprises at least one overlay page to be displayed as a unit in combination with the basic information,
the overlay page being encoded as a private stream,
transmitting said information signal from a transmitter device to a receiver device
wherein the overlay information additionally comprises:
a presentation timestamp which denotes an initial presentation time of the overlay information, and
time information for controlling a period of time during which the overlay information is to be displayed,
the time information being expressed in units of an available MPEG system clock of the receiver device.

2. The method of claim 1, wherein the time information comprises a duration for controlling the duration reckoned from an instant at which the overlay information may appear on the display.

3. The method of claim 1, wherein the basic information includes time codes for controlling a relative time of the basic information, and in that the time information includes a time of removal for controlling a relative instant after which the particular overlay information is to be removed from the display.

4. The method of claim 1, wherein the basic information comprises video information and the overlay information comprises graphics information.

5. The method of claim 1, wherein the overlay information comprises subtitle texts.

6. The method of claim 1, wherein the basic information comprises digital, compressed video information.

7. The method of claim 1 comprising:
providing the basic information at a first input,
providing the overlay information a second input, the overlay information being related to the basic information
combining the basic information and overlay information to form a information signal
providing overlay-display information about the display of overlay information at a third input,
generating time code information from the overlay-display information,
processing the information signal for combining the time code information with the overlay information,
wherein transmitting said information signal from a transmitter device to a receiver device includes: converting the information signal to a transmission signal, transmitting the transmission signal from the transmitter device into a medium, receiving the transmission signal from the medium into the receiver device, and recovering the information signal from the received transmission signal in the receiver device,
recovering the time code information from the recovered information signal;
forming a video signal of images, the images including combined images each comprising a portion of an image of the basic information combined with overlay information depending on the recovered time code information,
displaying the images of the video signal.

8. The method of claim 1 wherein the overlay information includes a first overlay information and a different second overlay information and only one of the first and second overlay information can be optionally displayed.

9. A non-transitory information carrier on which an information signal is recorded which information signal represents video information for reproduction on a display of a receiver device,
the video information being a multiplexed MPEG stream, the video information comprises basic information and overlay information related to the basic information, the basic information being an elementary stream of encoded video data, the overlay information comprises at least one overlay page to be displayed as a unit in combination with the basic information, the overlay page being encoded as a private stream, wherein the overlay information additionally comprises:

a presentation timestamp which denotes an initial presentation time of the overlay information, and time information for controlling a period of time during which the overlay formation is to be displayed, the time information being expressed in units of an MPEG system clock.

10. The information carrier of claim 9, wherein the time information comprises a duration for controlling the period of time during which the overlay formation is to be displayed reckoned from an instant at which the overlay information may appear on a television screen.

11. The information carrier as claimed in claim 9, wherein the basic information includes time codes for controlling a relative time of the basic information, and in that the time information includes a time of removal for controlling a relative instant after which the particular overlay information is to be removed from the display.

12. The information carrier as claimed in claim 9, wherein the basic information comprises video information and the overlay information comprises graphics information.

13. The information carrier of claim 9, wherein the overlay information comprises subtitle texts.

14. The information carrier of claim 9, wherein the basic information comprises digital, compressed video information.

15. A receiver device for receiving video information for reproduction on a display via an information signal that represents the video information, the video information being a multiplexed MPEG stream, the video information comprising basic information and overlay information related to the basic information, the basic information being an elementary stream of encoded video data, which overlay information comprises at least one overlay page to be displayed as a unit in combination with the basic information, the overlay page being encoded as a private stream, wherein the overlay information additionally comprises:

a presentation timestamp which denotes an initial presentation time of the overlay information, and time information for controlling a period of time during which the overlay information is to be displayed, the time information being expressed in units of an available MPEG system clock of the receiver device.

which receiver device comprises;

means for receiving the information signal, and combining means for generating a video signal for displaying the basic information combined with the overlay information, means for recovering the time information from the information signal and wherein the combining means are arranged for controlling the displaying of the overlay information as a function of the time information.

16. The receiver device of claim 15, comprising means for reading the information signal from an information carrier.

17. The receiver device of claim 15, comprising a display for displaying the overlay information simultaneously with portions of the basic information that are not overlaid by the overlay information, the portions of the basic information that are overlaid with the overlay information not being displayed.

18. The receiver device of claim 15 wherein:

the receiving means includes reception means for receiving a transmission signal from a medium and means for recovering the information signal from the transmission signal, the video signal comprises images, the images including combined images each comprising a portion of an image of the basic information combined with overlay information depending on the recovered time code information, the receiver device comprising a video display for displaying the images of the video signal.

19. A transmitter device for transmitting video information to a receiver device for reproduction on a display, the video information being a multiplexed MPEG stream, the video information comprising basic information and overlay information related to the basic information, the basic information being an elementary stream of encoded video data, the overlay information comprises at least one overlay page to be displayed as a unit in combination with the basic information, the overlay page being encoded as a private stream, wherein the overlay information additionally comprises:

a presentation timestamp which denotes an initial presentation time of the overlay information, and time information for controlling a period of time during which the overlay information is to be displayed, the time information being expressed in units of an MPEG system clock of the receiver device, which transmitter device comprises:

generator means for generating the information signal, means for transmitting a complete information signal, and means for generating the time information and the generator means are arranged for adding the time information to the overlay information to form the complete information signal.

20. The transmitter device of claim 19, comprising:

means for recording the information signal for producing an information carrier.

21. The transmitter device of claim 19 comprising:

an input for providing the basic information, an input for providing the overlay information, an input for providing overlay display information, wherein the generator means includes an image generator means for combining the basic information and the overlay information to generate the information signal, and the generator means includes a multiplexor means for adding the time information to the overlay information to form the complete information signal; and the transmitting means includes means for converting the complete information signal into a transmission signal.

* * * * *